UNITED STATES PATENT OFFICE.

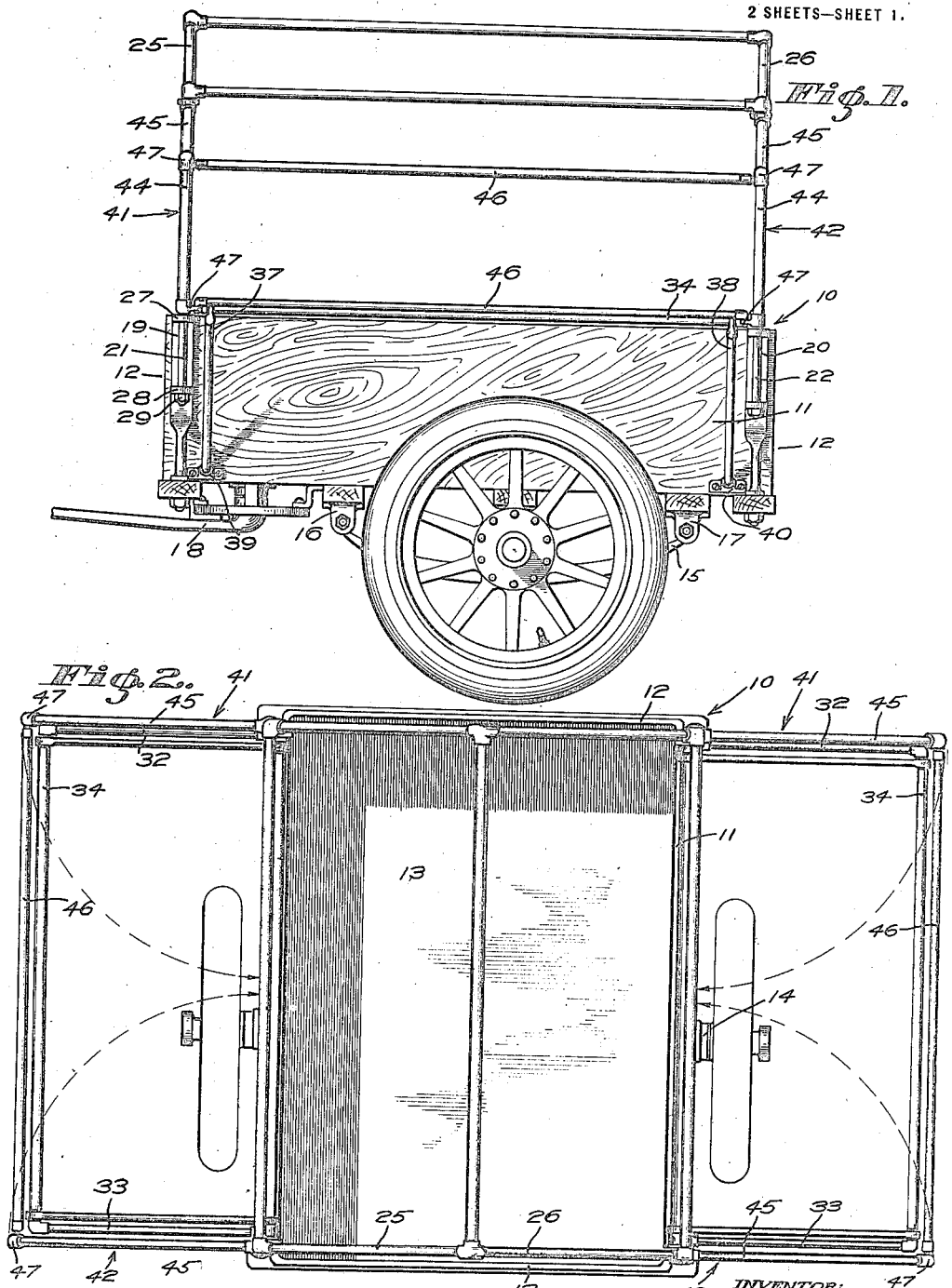

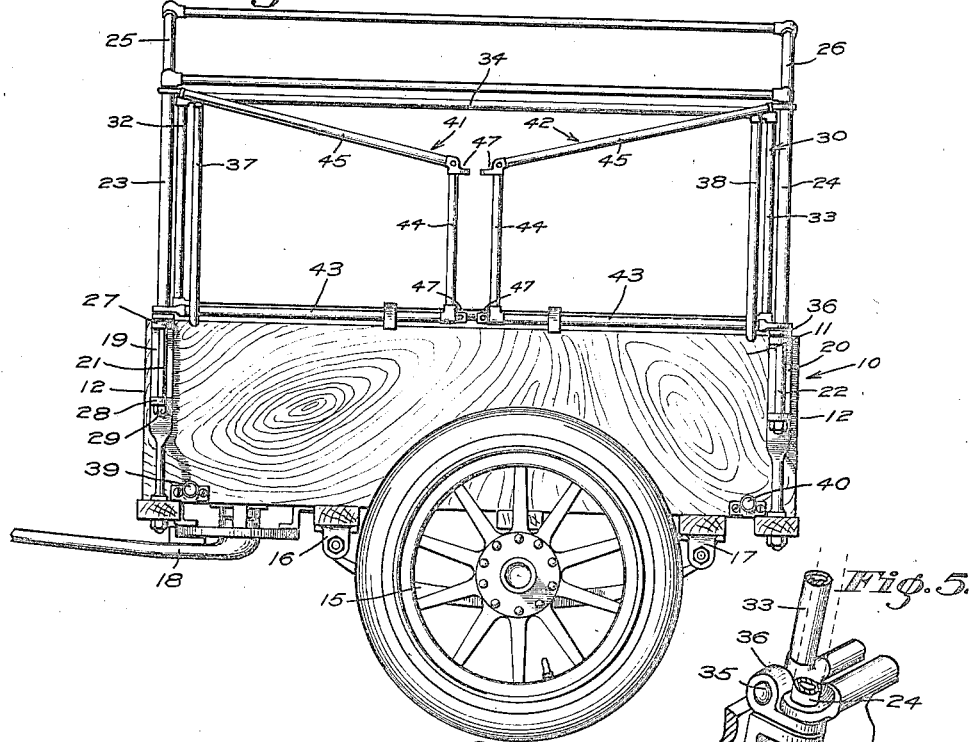
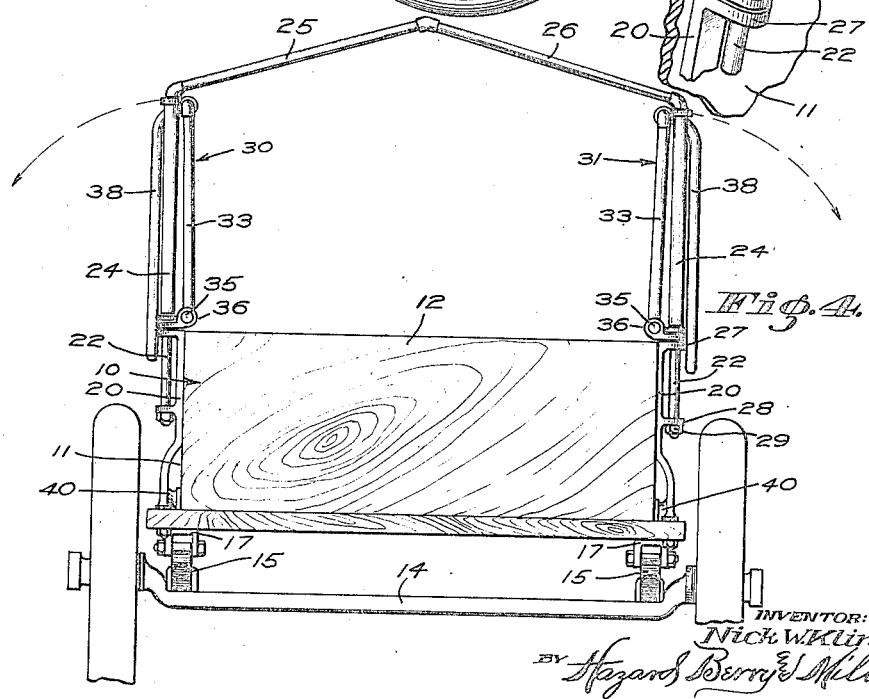

NICK W. KLINE, OF LOS ANGELES, CALIFORNIA.

AUTO-TRAILER.

1,247,282.   Specification of Letters Patent.   Patented Nov. 20, 1917.

Application filed May 31, 1916. Serial No. 100,900.

*To all whom it may concern:*

Be it known that I, NICK W. KLINE, a citizen of the United States, residing at Los Angeles, in the county of Los Angeles and State of California, have invented new and useful Improvements in Auto-Trailers, of which the following is a specification.

This invention relates to a trailer and pertains particularly to an extendable tent top for auto trailers.

It is the object of this invention to provide a trailer with an extendable tent top, in which the top will normally cover the trailer in the manner common in covered vehicles to protect the contents of the trailer from the weather, but which is so formed that the side portions of the cover may be extended to project over the wheels of the trailer and form bed spring supports so that seats or beds may be arranged on the opposite sides of the trailer.

Another object is to provide a foldable frame work for extending the side portions of the trailer cover, which is simple in construction and adapted to be readily disposed in either its extending or folded positions.

Other objects will appear hereinafter.

The invention is illustrated in the accompanying drawings in which:

Figure 1 is a view in side elevation of the trailer showing the extendable tent frame in its open position, the tent covering being removed.

Fig. 2 is a view in plan illustrating the frame as extended and showing the bed supporting members.

Fig. 3 is a view in side elevation of the trailer with the side extensions shown as folded, and swung from their operative position.

Fig. 4 is a view of the trailer as seen in rear elevation and with the side members in their uppermost position.

Referring to the drawings more particularly, 10 indicates the rectangular body portion of the trailer which is formed with sides 11 and ends 12. A bottom 13 of suitable strength to support considerable weight is secured beneath the sides and ends and is mounted upon a vehicle axle 14 which is resiliently connected thereto by means of vehicle springs 15 secured at their outer ends to spring brackets 16 and 17 which are in turn rigidly mounted beneath the body of the trailer. A suitable draw-bar 18 is provided on the trailer and adapted to be connected to a vehicle by which it is drawn.

The essence of the invention resides in fitting the body of the trailer with a covered top, having foldable side portions, which normally extend substantially in continuation of the trailer sides 11, but which may be extended to project over the wheels to enlarge the capacity of the trailer particularly when the latter is to be employed as a tent, and also in hinged panels adapted to carry bed springs, which panels may be folded to extend vertically within the outer wall of the cover when not in use or disposed horizontally and braced in relation to the trailer body when the sides of the cover are extended. The detailed construction of the foregoing structure will now be set forth.

Disposed adjacent the corners of the rectangular body 10 are brackets 19 and 20 which are adapted to receive the ends 21 and 22 of upright members 23 and 24 which, as shown particularly in Fig. 4, are connected at their upper ends by means of a pair of angularly disposed roof members 25 and 26, which bridge the gap between them and provide an end support for the fabric roofing. The upright members are held in position upon the brackets 19 and 20 by means of ears 27 and 28 which are positioned apart from each other and adapted to receive the lower extending ends of the uprights and be secured in place by means of nuts 29. The two end frame members which are composed of the pair of uprights and their cross members, when when secured in place, form the main frame of the structure.

The side extensions 30 and 31 which are adapted to be swung into a horizontal position, are comprised of end portions 32 and 33 and side portions 34. The end members 32 are pivotally mounted by means of pins 35 within brackets 36 which are in turn secured in a suitable manner upon the uprights and bear upon the upper ears 27 of the brackets which are secured to the body of the trailer. A pair of legs 37 and 38 are pivotally secured upon the side member 34 and are adapted to rest within sockets 39 and 40 when the side frames are in their lowermost position. When the frames 30 and 31 are down, they are of suitable strength to support the mattress and springs of a bed which is not shown in the drawings.

In order that the side extensions and the main body frame may be continuously covered with canvas, hinged end members or extensions 41 and 42 are provided and pivotally secured upon the uprights. These members are formed with horizontal frame portions 43 to which is connected an upright 44 and from which an upwardly diverging roof member 45 extends to a point adjacent the end of the members 25 and 26. This roof member is disposed at approximately the same angle as the body frame roof members 25 and 26 and when these end portions are swung outwardly and in alinement with the ends of the frame body they will form a suitable roof support in combination with the main frame. When the end members 41 and 42 are in their outward positions, they are so held by means of horizontally disposed spacing bars 46 which are provided with a pin at each of their ends adapted to engage sockets 47 which hold them in position. There are two of the bars 46 on each side, the upper bar on each side serving to support the eaves or outer sides of the canvas roof. The side extensions 30 and 31 swing downwardly between the end extensions 41 and 42 and the spacing bars 46 lock the end extensions together against the ends of the side extensions, so as to hold the frame square. At least one of each pair of spacing bars 46 has hooks or vertical pins engaging the sockets 47 so as to hold the end extensions from moving to or from each other.

The pins 35 are inside of the corner posts 23 and 24 so that the side extensions 30 and 31 fold into vertical planes inside of the corner posts, thus allowing the end extensions to fold flush with the corner posts, the side extensions being short enough to readily pass between the corner posts. The side extensions and end extensions may be held in their folded positions to form sides of the restricted frame.

The cross connections 25 and 26 between the corner posts slope upwardly to the centers, thus forming end rafters for the roof, and these centers are connected by a ridge pole. The upper members 45 of the end extensions slope outwardly and downwardly and form continuations of the end rafters.

When it is desired to place the roof frame upon the trailer the nuts 29 are removed from the upright extensions and the extension members 21 and 22 are placed through the ears 27 and 28 of the brackets 19 and 20 which, as previously described, are suitably secured to the trailer body. The frame, when so positioned, may now be covered with a canvas covering or may be further unfolded to accommodate beds or provide sitting room. This may be done by swinging the end members 41 and 42 outwardly until they are in alinement with the ends of the main frame. The side extensions 31 are then swung down from either side of the frame and supported by means of the angularly disposed supporting members 37 and 38 which seat within the sockets 39 and 40 secured at the lower edge of the trailer bed. Springs and mattresses may now be positioned upon the extensions and supported thereby. The members 23 and 24 may now be or may have been covered with canvas and the roof portion rolled down until it incloses the entire side of the frame.

The tent frame may be readily attached to or removed from the trailer body so that the trailer may be employed with or without the cover, and from the foregoing it will be seen that the tent portion may be easily extended to form additional room and bed space when desired, and the extendable portions refolded into a compact space when not in use.

I claim:

1. A vehicle trailer, comprising a body and running gear therebeneath, an upright frame member detachably mounted upon said body, horizontally swinging end extensions pivotally mounted upon said frame and adapted to swing outwardly at the ends and upon both sides of the upright frame, a bed supporting frame adapted to swing downwardly and into a horizontal position between said outwardly extending end members, and braces pivoted to the bed supporting frame detachably engageable with the trailer body.

2. In an automobile trailer, a body, and a frame removably mounted upon the body, said frame comprising corner posts, cross connections between the upper ends of the corner posts and forming inclined rafters, a ridge pole between the cross connections, horizontally swinging end extensions pivotally mounted upon the corner posts and forming extensions of the rafters, side extensions pivotally mounted between the corner posts and adapted to swing downwardly between the end extensions, and spacing bars connecting the end extensions and holding them against the ends of the side extensions.

3. In an automobile trailer, a body, and a frame removably mounted upon the body, said frame comprising corner posts detachably connected at the corners of the body, cross connections between the corner posts and forming rafters, a ridge pole connecting the cross connections, horizontally swinging end extensions pivotally mounted upon the corner posts, side extensions pivotally mounted to swing to vertical planes inside of the corner posts and to swing outwardly and downwardly between the corner posts and between the end extensions, and spacing bars connecting the end extensions and holding them against the ends of the side extensions, said end extensions forming continuations of the rafters, and the upper ones of said spacing bars being adapted to support the eaves of a canvas roof.

In testimony whereof I have signed my name to this specification.

NICK W. KLINE.